Nov. 6, 1923.
C. F. MATTINGLY
1,473,154
AUTOMATIC LIQUID LEVEL GAUGE VALVE
Filed March 8, 1922
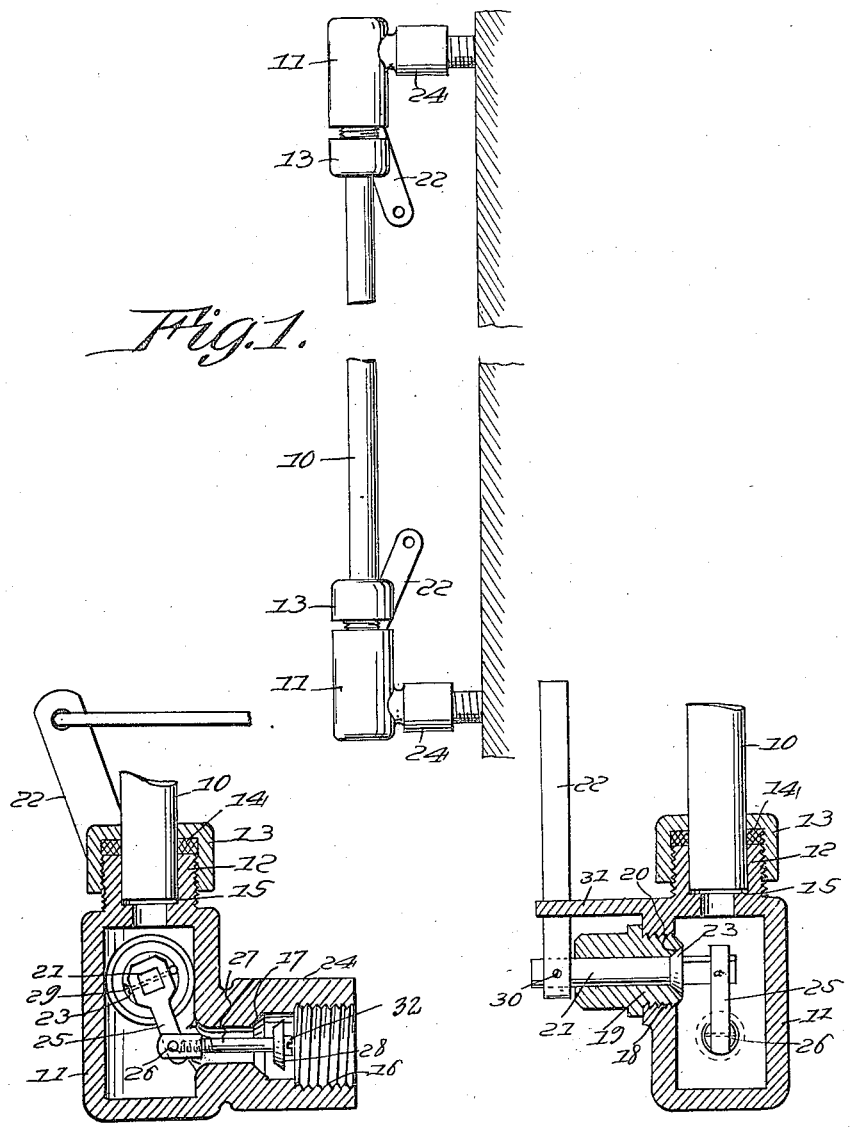

Patented Nov. 6, 1923.

1,473,154

UNITED STATES PATENT OFFICE.

CHARLES F. MATTINGLY, OF ST. LOUIS, MISSOURI, ASSIGNOR TO MATTINGLY AUTOMATIC VALVE CO., OF ST. LOUIS, MISSOURI, A CORPORATION OF MISSOURI.

AUTOMATIC LIQUID-LEVEL GAUGE VALVE.

Application filed March 8, 1922. Serial No. 542,056.

*To all whom it may concern:*

Be it known that I, CHARLES F. MATTINGLY, a citizen of the United States, residing at St. Louis, State of Missouri, have invented certain new and useful Improvements in Automatic Liquid-Level Gauge Valves, of which the following is a specification, reference being had to the accompanying drawings.

This invention relates to gauge valves, that is valves which are connected to gauge glasses and act to close off communication between the boiler and the gauge glass in case the gauge glass should break.

One of the objects of this invention is to provide a valve of this character whose stem does not pass through a packing gland or other packing which has to be renewed, but wherein the escape of steam around the stem of the valve is prevented by an auxiliary valve held to its seat by the pressure of the steam.

A further object is to provide a gauge glass valve so constructed that upon the breaking of the gauge glass the pressures acting on the valve will no longer be equalized and the valve will close and cut off communication between the glass and the boiler by the pressure of steam acting on one side of the glass.

A still further object is to provide a valve of this character which not only acts automatically but which may be shifted by hand either to its closed or open position.

Other objects will appear in the course of the following description.

My invention is illustrated in the accompanying drawings, wherein:—

Figure 1 is a side elevation of a gauge glass having my improved valves applied thereto;

Figure 2 is a vertical sectional view of the lower valve casing, the valve being shown in elevation;

Figure 3 is a sectional view at right angles to Figure 2.

Referring to these drawings, 10 designates a gauge glass of any ordinary or suitable construction. An angular valve casing 11 is engaged with the gauge glass, both at its upper and lower ends, and within these angular valve casings are disposed the automatic valves which form the subject of my invention. Inasmuch as the valve at the upper end of the gauge glass is the same as the valve at the lower end of the gauge glass, a description of the latter will suffice for the former.

The angular casing at its upper end is reduced and exteriorly screw-threaded, as at 12, to receive the packing nut 13, within which is disposed packing 14 bearing against the upper end of the reduced portion 12. A seat 15 is formed at the upper end of the valve casing for the support of the lower end of the gauge glass 10, this seat defining a port leading from the interior of the valve casing into the gauge glass. The opposite end of the casing is interiorly screw-threaded, as at 16, to be connected by any usual or suitable connection to the boiler, and inward of this screw-threaded portion 16 there is formed the annular valve seat 17. The vertical portion of the casing below the seat 15 has a screw-threaded opening in its side wall, designated 18, and screw-threaded into this opening is the bushing 19 formed at its inner end with a conical valve seat 20. Passing through this bushing is a rotatable stem 21, which at its outer end is pinned to, or otherwise connected to, an operating arm 22 so that the stem 21 may be oscillated. The stem 21 intermediate of its length is formed with the conical valve 23 which fits the valve seat 20 and is at all times in tight rotative contact therewith. The inner end of the valve stem beyond this valve 23 is squared to receive the square socket of an arm 25 and this arm 25 is pivotally connected to a bifurcated head 26 which is formed with an interiorly screw-threaded socket for the stem 27 of a valve 28 which coacts with the seat 17. A cotter pin 29 holds the arm 25 in place upon the squared end of the stem 21 and a cotter pin 30 holds the operating arm 22 in engagement with the stem 21.

Assuming now that the main valve 28 is in its closed position and against the seat 17, then by pulling the operating lever 22 outward from the position in Figure 1 to the position shown in Figure 2 until it bears against a stop lug 31 formed upon the valve casing, the auxiliary stem 21 and the valve 23 will, of course, be oscillated in bushing 19 and the arm 25 will be oscillated to open the valve 28 or shift it from its seat. This opens communication between the boiler or other reservoir through the valve casing to the gauge glass. In moving the main valve 28 from open to closed position or vice versa, the auxiliary valve 23 remains against its seat and the pressure of steam or other fluid within the valve casing forces this auxiliary valve 23 against its seat so that the necessity for packing around the auxiliary valve stem 21 is entirely eliminated so that the valve is a "packless" valve. This eliminates the necessity of constantly renewing packing around the stem 21 and also eliminates the friction which is incident to a valve stem passing through packing.

Now in case the gauge glass breaks, the pressure, which was equalized on the inside and outside of the main valve 28, is no longer confined within the gauge glass but the fluid commences to rush out through the rent in the gauge glass and as the area of the gauge glass is somewhat larger than the area around the main valve, the pressure reduces exteriorly of the valve much faster than it can interiorly of the main valve and the steam or other fluid is rushing out of the valve casing faster than it can rush into the valve casing around the main valve so that the fluid exerts its pressure against the valve 28 and causes this valve to close, thus cutting off communication from the reservoir to the gauge glass and stopping the flow.

It will be obvious that the main valve may be adjusted by inserting a screw-driver within the nick 32 and rotating the stem 27 so as to secure a proper closing action of the main valve against its seat. The upper end of the operating arm or lever 22 is apertured so that a wire or other device may be attached to the arm and extend to any part of the building or outside of the building, if desired, so that the valve may be positively opened or positively closed without the necessity of anyone approaching the valve.

While I have illustrated an embodiment of my invention which I believe to be particularly effective in practice, which is very simple and easy of application, yet I do not wish to be limited to the exact form and embodiment shown, as it is obvious that this may be varied in many ways without departing from the spirit of the invention. It will be seen that my valve automatically closes the instant there is a break in the gauge glass and that as it requires no packing no attention has to be paid to the valve, and further that as packing is eliminated the valve will operate very easily.

I claim:—

1. The combination with a gauge glass, of a valve casing therein adapted to be connected to a reservoir at the end opposite its connection to the gauge glass and having a valve seat at this end, a reciprocable valve adapted to close against said seat, a rotatable stem entering the casing and operatively connected to said valve to operate it, the area of the passage in which the valve operates being smaller than the area of the gauge glass, and a bushing through which said stem passes and by which it is oscillatably supported, the bushing having a conical valve seat opening upon the interior of the casing and the stem having a conical valve bearing at all times against said seat.

2. The combination with a gauge glass, of a gauge valve comprising an angular casing having means to receive and engage the gauge glass at one end, the opposite end being adapted to be connected to a reservoir and having a conical valve seat, a reciprocable valve adapted to engage said seat and having a stem, a bushing detachably engaging in the side wall of the valve casing and having a central bore, the inner end of the bushing being formed with a conical valve seat, an oscillatable stem passing through said bushing and having a conical packing valve fitting said seat, an operating arm mounted upon the exterior end of the stem, and an arm mounted upon the inner end of the stem and within the casing and operatively connected to the main valve stem.

3. The combination with a gauge glass, of a gauge valve comprising an angular casing having means to receive and engage the gauge glass at one end, the opposite end being adapted to be connected to a reservoir and having a conical valve seat, a reciprocable valve adapted to engage said seat and having a stem, a bushing detachably engaging in the side wall of the valve casing and having a central bore, the inner end of the bushing being formed with a conical valve seat, an oscillatable stem passing through said bushing and having a conical valve fitting said seat, an operating arm mounted upon the exterior end of the stem, an arm mounted upon the inner end of the stem and within the casing, and a head pivoted to said arm and having an interiorly screw-threaded socket, the main valve stem being screw-threaded to engage said socket whereby the main valve may be adjusted.

4. A gauge glass valve including an angular valve casing, one end of the valve casing being exteriorly threaded, a packing nut engaging said threaded end, this end of the casing being formed to provide a seat for the gauge glass, the opposite end of the casing being screw-threaded and thereby adapted to be connected to a reservoir, the interior of the casing inward of this last named screw-threaded end having a conical valve-seat, the side wall of the casing having an interiorly screw-threaded aperture, and a stop lug, a bushing having threaded engagement with the aperture and formed at its inner end with a conical valve seat, an oscillatable stem passing through the bushing and formed with a conical valve at all times bearing against said seat, the inner end of said stem being many-sided in cross section, an operating arm operatively connected to the outer end of the stem, an arm fitting the many-sided end of the stem and extending radially therefrom, a reciprocable valve adapted to fit the first named valve seat and operatively engaged with said radial arm, the space between the periphery of the valve and the wall of the casing being less in area than the cross sectional area of the associated gauge glass whereby upon the breaking of the gauge glass the valve will be forced to a closed position by pressure.

In testimony whereof I hereunto affix my signature.

CHARLES F. MATTINGLY.